US 12,552,354 B2

(12) United States Patent
Travaglia et al.

(10) Patent No.: US 12,552,354 B2
(45) Date of Patent: Feb. 17, 2026

(54) COMPUTER SYSTEM AND A COMPUTER-IMPLEMENTED METHOD OF INCREASING DRIVER COMFORT DURING A BRAKING EVENT

(71) Applicant: Volvo Truck Corporation, Gothenburg (SE)

(72) Inventors: Carlos Abilio Travaglia, Curitiba (BR);
Fabio Drzevieski, Palmeira (BR);
Andre Rodrigues, Curitiba (BR);
Eduardo Miranda, Curitiba (BR)

(73) Assignee: Volvo Truck Corporation, Gothenburg (SE)

( * ) Notice: Subject to any disclaimer, the term of this patent is extended or adjusted under 35 U.S.C. 154(b) by 38 days.

(21) Appl. No.: 18/596,990

(22) Filed: Mar. 6, 2024

(65) Prior Publication Data
US 2024/0308484 A1    Sep. 19, 2024

(30) Foreign Application Priority Data
Mar. 17, 2023   (EP) ..................... 23162748

(51) Int. Cl.
  *B60T 8/17*     (2006.01)
  *B60T 8/1755*   (2006.01)
  *B60T 8/1766*   (2006.01)

(52) U.S. Cl.
CPC ...... *B60T 8/17551* (2013.01); *B60T 8/17557* (2013.01); *B60T 8/1766* (2013.01); *B60T 2201/16* (2013.01)

(58) Field of Classification Search
CPC .............. B60T 8/1708; B60T 8/17551; B60T 8/17557; B60T 8/1766; B60T 2201/16;
(Continued)

(56) References Cited

U.S. PATENT DOCUMENTS 7,677,117 B2 *  3/2010  Perriard ................... B60T 8/52
                                                  73/779
11,351,969 B2   6/2022  Nitta et al.
(Continued)

FOREIGN PATENT DOCUMENTS

CN    114215703 B    2/2024
DE    10325623 A1    12/2004
(Continued)

OTHER PUBLICATIONS

Extended European Search Report mailed Sep. 12, 2023 for European Patent Application No. 23162748.0, 11 pages.
(Continued)

*Primary Examiner* — Hai H Huynh
*Assistant Examiner* — Johnny H Hoang
(74) *Attorney, Agent, or Firm* — Sage Patent Group

(57) ABSTRACT

A computer system including processing circuitry configured to: determine, during a braking event of a vehicle, an oscillation amplitude of a currently oscillating part of the vehicle; perform an amplitude comparison by comparing the determined oscillation amplitude with a predefined reference value; receive a brake request value indicative of a desired total brake torque or total brake force; perform a brake request comparison by comparing the received brake request value with a predefined brake request value; and control a brake distribution between front axle brakes and rear axle brakes of the vehicle based on the amplitude comparison and the brake request comparison, wherein the brake distribution is in the form of a brake torque distribution of said desired total brake torque or a brake force distribution of said desired total brake force. There is also disclosed a computer-implemented method.

20 Claims, 6 Drawing Sheets

(58) Field of Classification Search
CPC .. B60T 8/175; B60T 8/17555; B60T 2230/04; B60T 2230/06; B60W 10/184; B60W 30/02; B60W 10/06; B60W 2556/00
USPC .......................................................... 701/70
See application file for complete search history.

(56) References Cited

U.S. PATENT DOCUMENTS

| | | | |
|---|---|---|---|
| 12,024,146 B2* | 7/2024 | Takahashi | B60T 8/172 |
| 2006/0047400 A1* | 3/2006 | Prakash | B60L 7/14 |
| | | | 701/70 |
| 2019/0367002 A1* | 12/2019 | Pursifull | B60T 8/885 |
| 2020/0391711 A1* | 12/2020 | Nitta | B60T 7/20 |
| 2023/0256786 A1* | 8/2023 | Johnson | B60G 21/106 |
| | | | 280/5.515 |

FOREIGN PATENT DOCUMENTS

| | | |
|---|---|---|
| EP | 2581259 A1 | 4/2013 |
| WO | 2008071577 A1 | 6/2008 |
| WO | 2016055274 A1 | 4/2016 |

OTHER PUBLICATIONS

Jacobson et al.: "Vehicle Dynamics Compendium for Course MMF062," Vehicle Dynamics Group, Division of Vehicle and Autonomous Systems, Department of Applied Mechanics, Chalmers University of Technology, Jan. 1, 2015, 267 pages.

* cited by examiner

COMPUTER SYSTEM AND A COMPUTER-IMPLEMENTED METHOD OF INCREASING DRIVER COMFORT DURING A BRAKING EVENT

CROSS REFERENCE TO RELATED APPLICATIONS

This application claims priority to European Patent Application No. 23162748.0, filed on Mar. 17, 2023, the disclosure and content of which is incorporated by reference herein in its entirety.

TECHNICAL FIELD

The disclosure relates generally to a computer system and a computer-implemented method. In particular aspects, the disclosure relates to a computer system and a computer-implemented method of increasing driver comfort during a braking event. The disclosure can be applied to heavy-duty vehicles, such as trucks, buses, and construction equipment, among other vehicle types. Although the disclosure may be described with respect to a particular vehicle, the disclosure is not restricted to any particular vehicle.

BACKGROUND

In heavy-duty vehicles, during a braking event, the comfort of the driver may be directly related to perception of vibration by the driver. This effect is known as "brake judder". The brake judder may be caused by irregularities of a brake drum or a brake disk. For example, brake judder may be caused by "out of roundness" of front brake drums. The effect of such out of roundness on the judder may increase depending on the braking torque level and the temperature of the brakes. It would be desirable to reduce discomfort due to judder without compromising on braking performance.

SUMMARY

According to a first aspect of the disclosure, there is provided a computer system comprising processing circuitry configured to:
  determine, during a braking event of a vehicle, an oscillation amplitude of a currently oscillating part of the vehicle,
  perform an amplitude comparison by comparing the determined oscillation amplitude with a predefined reference value,
  receive a brake request value indicative of a desired total brake torque or total brake force,
  perform a brake request comparison by comparing the received brake request value with a predefined brake request value, and
  control a brake distribution between front axle brakes and rear axle brakes of the vehicle based on the amplitude comparison and the brake request comparison, wherein said brake distribution is in the form of a brake torque distribution of said desired total brake torque or a brake force distribution of said desired total brake force.

The first aspect of the disclosure may seek to provide comfort during braking, without compromising on braking performance. By controlling the brake force/torque distribution between the front and rear axle brakes based on an amplitude comparison, the driver comfort can be increased while still applying the total brake torque/force requested for a brake event. A technical benefit may include that the computer system may provide comfort during braking independently of variables that causes the brakes to judder. Such variables may include excessive run out of front brake drums, misalignment between front external surfaces of rims and drums of front wheels, permanent deformation of the brake drum due to excessive and long duration applied mechanical load (e.g. parking brake actuation), incorrect adjustment of the clearance between front brake drums and brake shoes after predictive maintenance, irregularities on the brake disc surface and excessive front brake temperature level.

It should be understood that the system of the present disclosure allows for direct detection of the judder rather than assumed or indirect detection. For instance, indirect assumed brake judder detection using pressure sensors may fail to detect brake judder as such measurements may be based on the assumption that vibration is only being caused by pressure fluctuations during braking at certain vehicle speeds. Furthermore, it is known that the temperature of the brakes can also have influence on the range of the frequency of the chassis vibration, which would not be detected by pressure sensors. By basing the brake force/torque distribution on an oscillation amplitude according to the disclosure also temperature-caused judder can be handled.

The oscillation amplitude may suitably be determined by taking an average value of amplitude measurements. For instance, the processing circuitry may be configured to take into account the amplitude measurements for a certain period of time and calculate an average value for that period of time, or the processing circuitry may be configured to take a certain number of oscillations into account and calculate an average value based on those oscillations. The predefined reference value may, for instance, be set based on tests. The predefined reference value may therefore suitably be set at a value at which the driver is not expected to perceive any judder. Therefore, if the processing circuitry determines that the oscillation amplitude during a braking event is greater than the predefined reference value, the brake distribution may be appropriately controlled to avoid discomfort for the driver. Furthermore, in at least some examples the predefined reference value may be just one possible value, whereas in at least some examples, the predefined reference value may be set based on the vehicle velocity. For instance, at a relatively high vehicle velocity the processing circuitry may compare the determined oscillation amplitude with one predefined reference value, whereas at a relatively low vehicle velocity the comparison may be made with another predefined reference value. As will be discussed in more detail later, said currently oscillating part of the vehicle for which an oscillation amplitude is determined may, for instance, be a portion of the chassis, or the steering column or steering wheel.

In some examples, including in at least one preferred example, optionally the processing circuitry is configured to, upon the brake request comparison revealing that the received brake request value is higher than the predefined brake request value, controlling the application of the front axle brakes and the rear axle brakes to apply and maintain an originally set brake torque or brake force distribution. A technical benefit may include that by predefining a brake request value, which is indicative of an emergency braking, the processing circuitry may effectively keep the original designed brake torque/force distribution to the front and rear axle brakes. In other words, in an emergency situation, stopping the vehicle is the top priority and therefore redistribution of brake torque/force need not be considered. It should be noted that the originally set or designed brake torque/force distribution does not necessarily need to have the same torque/force on the rear and front axle brakes. Rather it can be regarded as a nominal distribution (e.g. set in the factory when manufacturing the vehicle). Irrespective of the relative contribution of the rear and front axle brakes in the originally set brake torque/force distribution, in an emergency situation that the brake torque/force distribution that will be used, i.e. in an emergency situation there will be no redistribution of the original setting.

There may be at least two scenarios in which the computer system may ignore redistribution of brake torque/force, allowing the original brake torque/force distribution to be applied to both front axle and rear axle brakes. One of the scenarios is the above exemplified emergency braking event. Another scenario is when the determined oscillation amplitude is lower than the predefined reference value and therefore judder is not expected to be perceived by the driver. In contrast, if the oscillation amplitude is larger than the predefine reference value and the brake request does not indicate emergency braking, then the processing circuitry may control the brake distribution so that the rear axle brakes contribute more to the braking than the front axle brakes, whereby the judder will be less perceivable and the desired total brake torque/force will still be met. This is at least partly reflected below.

In some examples, including in at least one preferred example, optionally the processing circuitry is configured to, upon the amplitude comparison and the brake request comparison revealing that the determined oscillation amplitude is larger than the predefined reference value and that the received brake request value is lower than the predefined brake request value:
control said brake distribution between the front axle brakes and the rear axle brakes such that the contribution of the rear axle brakes on the braking increases as the contribution of the front axle brakes decreases relative to the originally set brake torque or brake force distribution.

A technical benefit may include that by reducing the contribution of the front axle brakes, the judder will not be perceived or at least be less perceived by the driver while still applying the total desired amount of brake torque or brake force. Thus, by taking into account the oscillation amplitude in comparison with the predefined reference value, the processing circuit can detect that the determined oscillation amplitude is high enough to cause driver discomfort, and if the brake request value is not indicative of an emergency braking event, the processing circuitry may control an appropriate brake distribution to reduce the risk of discomfort and yet meeting the brake request of the driver. Often, the above control of the brake distribution may, in practice, be such that more brake torque is provided to the rear axle brakes than to the front axle brakes. However, it should be noted that, even though the contribution of the front axle brakes is reduced, the resulting output torque of the front axle brakes may in some cases remain greater than that of the rear axle brakes.

In some examples, including in at least one preferred example, optionally the processing circuitry is configured to control said brake distribution based on the magnitude of the received brake request value. A technical benefit may include that the by adapting the brake distribution to the magnitude of the received brake request value, the wear on the front axle brakes and rear axle brakes may be better controlled. For instance, for a low brake request value, a higher percentage may be allocated to the rear axle brakes compared to for a high brake request value. If the brake request is high then it may be desirable to have a moderate redistribution of the brake distribution in order to avoid subjecting the rear axle brakes to much more wear than the front axle brakes. It may generally be desirable to have a substantially even wear on the front and rear axle brakes.

In some examples, including in at least one preferred example, optionally said predefined brake request value is a first predefined brake request value, wherein said brake request comparison may further comprise comparing the received brake request value with a second predefined brake request value, wherein the processing circuitry is configured to apply a first brake distribution if the received brake request value is between said first and second predefined brake request values, and apply a second brake distribution if the received brake request value is lower than said second predefined brake request value. A technical benefit may include that providing two or more predefined brake request values allows for an efficient yet simple adaptation of the brake distribution based on the magnitude of the received brake request value. It should be understood that there may be more than two predefined brake request values and thus more than two associated brake distributions for the processing circuitry to select from. Each brake distribution applied by the processing circuitry may suitably have a predefined percentage of the front and rear axle brake participation, respectively. In other words, when applying said first brake distribution the percentage of the front axle brake participation may be different from the percentage of the front axle brake participation when applying said second brake distribution.

In some examples, including in at least one preferred example, optionally the first predefined brake request value is higher than the second predefined brake request value, wherein when applying the first brake distribution, the processing circuitry is configured to allocated a lower brake torque to the rear axle brakes compared to when applying the second brake distribution. A technical benefit may include that, by applying lower brake torque to the rear axle brakes when the brake request value is high, the wear rate of the rear axle brakes may be limited. Since it is normally desirable to have an equal wear rate of the front and rear axle brakes, repeatedly applying more brake torque to the rear axle brakes than to the front axle brakes, will increase the wear rate of the rear axle brakes compared to front axle brakes. However, by reducing the percentage of rear axle brake participation at relatively high brake requests, the wear rate of the rear axle brakes can be somewhat reduced. As purely illustrative and non-limiting examples, some conceivable brake distributions will now be presented. For instance, when applying said first brake distribution, the processing circuitry may allocate to the rear axle brakes a participation of 50-75%, such as in the range of 55-70%, for example 62.5%, whereas the remaining percentage would be allocated to the front axle brakes. When applying said second brake distribution, the processing circuitry may, for instance, allocate to the rear axle brakes a participation of 60-90%, such as 70-80%, for example 75%, whereas the remaining percentage would be allocated to the front axle brakes.

In some examples, including in at least one preferred example, optionally the processing circuitry is configured to determine the oscillation amplitude by receiving from a sensor information about a measured angular acceleration amplitude in a vertical geometrical plane for the currently oscillating part. A technical benefit may include that angular acceleration amplitude can be effectively measured by means of various types of sensors. Naturally, if the vehicle oscillates in a vertical plane, this may at a certain amplitude be perceived by the driver. Examples of sensors that may be used for measuring angular acceleration amplitude include Inertial Motion Units (IMUs), accelerometers and gyroscopes.

The different direction of a vehicle can normally be defined as follows. The longitudinal direction is the direction in which the vehicle drives when the wheels are not turning. The longitudinal direction coincides or is parallel with what is normally referred to as the longitudinal axis of the vehicle. The vertical direction of the vehicle is perpendicular to the ground on which the vehicle stands. In other words, a vertical direction coincides or is parallel with what is normally referred to as the vertical axis of the vehicle. The width or lateral direction of the vehicle coincides or is parallel with the lateral axis of the vehicle, and is thus perpendicular to the previous two directions. Thus, a vertical geometrical plane in which the angular acceleration amplitude may be measured is a geometrical plane which is, or which is parallel to, a plane defined by the longitudinal axis and the vertical axis of the vehicle.

The sensor, such as an IMU, may measure directly the angular acceleration (i.e. the pitch effect of the vehicle), and may be positioned in any place on the vehicle chassis. During the parametrization of the processing circuitry, the position of the sensor may be referred, by means of coordinates, to an origin of a coordinate system. For instance, the vehicle GC (gravity center), the driver seat, or the steering wheel, may be suitable references for the origin of the coordinate system. Thus, from the above it can be understood that the currently oscillating part for which the oscillation amplitude is to be determined may be any suitable part of the vehicle, in particular any suitable part of the vehicle chassis.

In some examples, including in at least one preferred example, optionally the processing circuitry is configured to determine the oscillation amplitude by receiving from a steering angle sensor information about measured angular oscillations of a steering wheel or steering column of the vehicle. A technical benefit may include that many vehicles are already equipped with some type of steering angle sensor which detects angular oscillations of the steering wheel or steering column. Such steering angle sensors determine where the driver wants to steer, matching the steering wheel with the road wheels of the vehicle. By making use of the output of such sensors angular oscillations due to judder can be detected. Thus, from the above it can be understood that said currently oscillating part of the vehicle for which an oscillation amplitude is to be determined may, in at least some examples, be a steering wheel or steering column of the vehicle.

In some examples, including in at least one preferred example, optionally the processing circuitry is configured to be automatically activated during a brake event to perform said comparisons and said control of the brake distribution, or the processing circuitry is configured to receive an activation command which is manually triggered at a user interface, such as at a switch or a control panel, and upon receipt of the activation command the processing circuitry is configured to become activated to perform said comparisons and said control of the brake distribution. A technical benefit with having the processing circuitry automatically activated is that the processing circuitry will automatically strive to improve driver comfort. However, a technical benefit with having a manually triggered activation of the processing circuitry, is that the driver can select when to make use of the comfort control and when to accept the perception of judder. For instance, the driver may decide that for a certain part of the road or when driving with a certain load, additional wear on the rear brake axle should be avoided and thus the driver may refrain from activating the processing circuitry.

In some examples, including in at least one preferred example, optionally the computer system may further comprise said sensor, wherein the sensor is configured to measure oscillation amplitudes and inform the processing circuitry of the results of the measurements. A technical benefit may include that incorporating the sensor in the computer system may improve robustness of the computer system, as it will be less dependent on already existing sensors of a vehicle and their compatibility with other components of the computer system.

According to a second aspect of the disclosure, there is provided a vehicle comprising the computer system of the first aspect, including any examples thereof. The second aspect of the disclosure may seek to improve driver comfort similarly to the computer system of the first aspect. Technical benefits may include those discussed in relation to the computer system of the first aspect, including any examples thereof.

According to a third aspect of the disclosure, there is provided a computer-implemented method of increasing driver comfort during a braking event of a vehicle having front axle brakes and rear axle brakes, the method comprising:
  determining, by a processing circuitry of a computer system, during a braking event of a vehicle, an oscillation amplitude of a currently oscillating part of the vehicle,
  performing, by the processing circuitry, an amplitude comparison by comparing the determined oscillation amplitude with a predefined reference value,
  receiving, by the processing circuitry, a brake request value indicative of a desired total brake torque or total brake force,
  performing, by the processing circuitry, a brake request comparison by comparing the received brake request value with a predefined brake request value, and
  controlling, by the processing circuitry, a brake distribution between front axle brakes and rear axle brakes of the vehicle based on the amplitude comparison and the brake request comparison, wherein said brake distribution is in the form of a brake torque distribution of said desired total brake torque or a brake force distribution of said desired total brake force.

The third aspect of the disclosure may seek to provide comfort during braking, without compromising on braking performance. Analogously to what has already been discussed in relation to the computer system of the first aspect, a technical benefit may include that the computer-implemented method may provide comfort during braking independently of variables that causes the brakes to judder.

In some examples, including in at least one preferred example, optionally the method may further comprise:
  controlling, by the processing circuitry, the application of the front axle brakes and rear axle brakes to apply and maintain an originally set brake torque or brake force distribution when the brake request comparison reveals that the received brake request value is higher than the predefined brake request value.

Analogously to what has already been discussed in relation to examples of the computer system of the first aspect, a technical benefit may include that by predefining a brake request value, which is indicative of an emergency braking, the processing circuitry may effectively keep the originally designed brake torque/force distribution to the front and rear axle brakes.

In some examples, including in at least one preferred example, optionally the method may further comprise:

controlling, by the processing circuitry, said brake distribution between the front axle brakes and the rear axle brakes such that the contribution of the rear axle brakes on the braking increases as the contribution of the front axle brakes decreases relative to the originally set brake torque or brake force distribution when the amplitude comparison and the brake request comparison reveal that the determined oscillation amplitude is larger than the predefined reference value and that the received brake request value is lower than the predefined brake request value.

Analogously to what has already been discussed in relation to examples of the computer system of the first aspect, a technical benefit may include that by reducing the contribution of the front axle brakes, the judder will not be perceived or at least be less perceived by the driver while still applying the total desired amount of brake torque or brake force.

In some examples, including in at least one preferred example, optionally said predefined brake request value is a first predefined brake request value, wherein said brake request comparison further comprises comparing the received brake request value with a second predefined brake request value, wherein the method may further comprise:

applying, by the processing circuitry, a first brake distribution when the received brake request value is between said first and second predefined brake request values, and applying a second brake distribution when the received brake request value is lower than said second predefined brake request value.

Analogously to what has already been discussed in relation to examples of the computer system of the first aspect, a technical benefit may include that providing two or more predefined brake request values allows for an efficient yet simple adaptation of the brake distribution based on the magnitude of the received brake request value.

In some examples, including in at least one preferred example, optionally the first predefined brake request value is higher than the second predefined brake request value, wherein the method may further comprise:

allocating, by the processing circuitry, a lower brake torque to the rear axle brakes when applying the first brake distribution compared to when applying the second brake distribution.

Analogously to what has already been discussed in relation to examples of the computer system of the first aspect, a technical benefit may include that, by applying lower brake torque to the rear axle brakes when the brake request value is high, the wear rate of the rear axle brakes may be limited.

In some examples, including in at least one preferred example, optionally the method may further comprise:

determining, by the processing circuitry, the oscillation amplitude by receiving from a sensor information about a measured angular acceleration amplitude in a vertical geometrical plane for the currently oscillating part.

Analogously to what has already been discussed in relation to examples of the computer system of the first aspect, a technical benefit may include that angular acceleration amplitude can be effectively measured by means of various types of sensors.

In some examples, including in at least one preferred example, optionally the method may further comprise:

determining, by the processing circuitry, the oscillation amplitude by receiving from a steering angle sensor information about measured angular oscillations of a steering wheel or steering column of the vehicle.

Analogously to what has already been discussed in relation to examples of the computer system of the first aspect, a technical benefit may include that many vehicles are already equipped with some type of steering angle sensor which detects angular oscillations of the steering wheel or steering column, and thus use may be made of such existing sensors.

According to a fourth aspect of this disclosure there is provided a computer program product comprising program code for performing, when executed by the processing circuitry, the method of the third aspect, including any examples thereof. Technical benefits of the computer program product of the fourth aspect largely correspond to the technical benefits of the method of the third aspect and the computer system of the first aspect, including any examples thereof.

According to a fifth aspect of this disclosure there is provided a non-transitory computer-readable storage medium comprising instructions, which when executed by the processing circuitry, cause the processing circuitry to perform the method of the third aspect, including any examples thereof. Technical benefits of the non-transitory computer-readable storage medium of the fifth aspect largely correspond to the technical benefits of the method of the third aspect and the computer system of the first aspect, including any examples thereof.

The disclosed aspects, examples (including any preferred examples), and/or accompanying claims may be suitably combined with each other as would be apparent to anyone of ordinary skill in the art. Additional features and advantages are disclosed in the following description, claims, and drawings, and in part will be readily apparent therefrom to those skilled in the art or recognized by practicing the disclosure as described herein.

There are also disclosed herein computer systems, control units, code modules, computer-implemented methods, computer readable media, and computer program products associated with the above discussed technical benefits.

BRIEF DESCRIPTION OF THE DRAWINGS

Examples are described in more detail below with reference to the appended drawings.

DETAILED DESCRIPTION

The detailed description set forth below provides information and examples of the disclosed technology with sufficient detail to enable those skilled in the art to practice the disclosure.

The present disclosure seeks to reduce discomfort to a driver without compromising on safety, in particular without compromising on braking performance. To this end, a computer system and a computer-implemented method is presented which can detect the level of brake judder and apply an appropriate brake distribution taking into account also a brake request provided by the driver.

Figure 1:
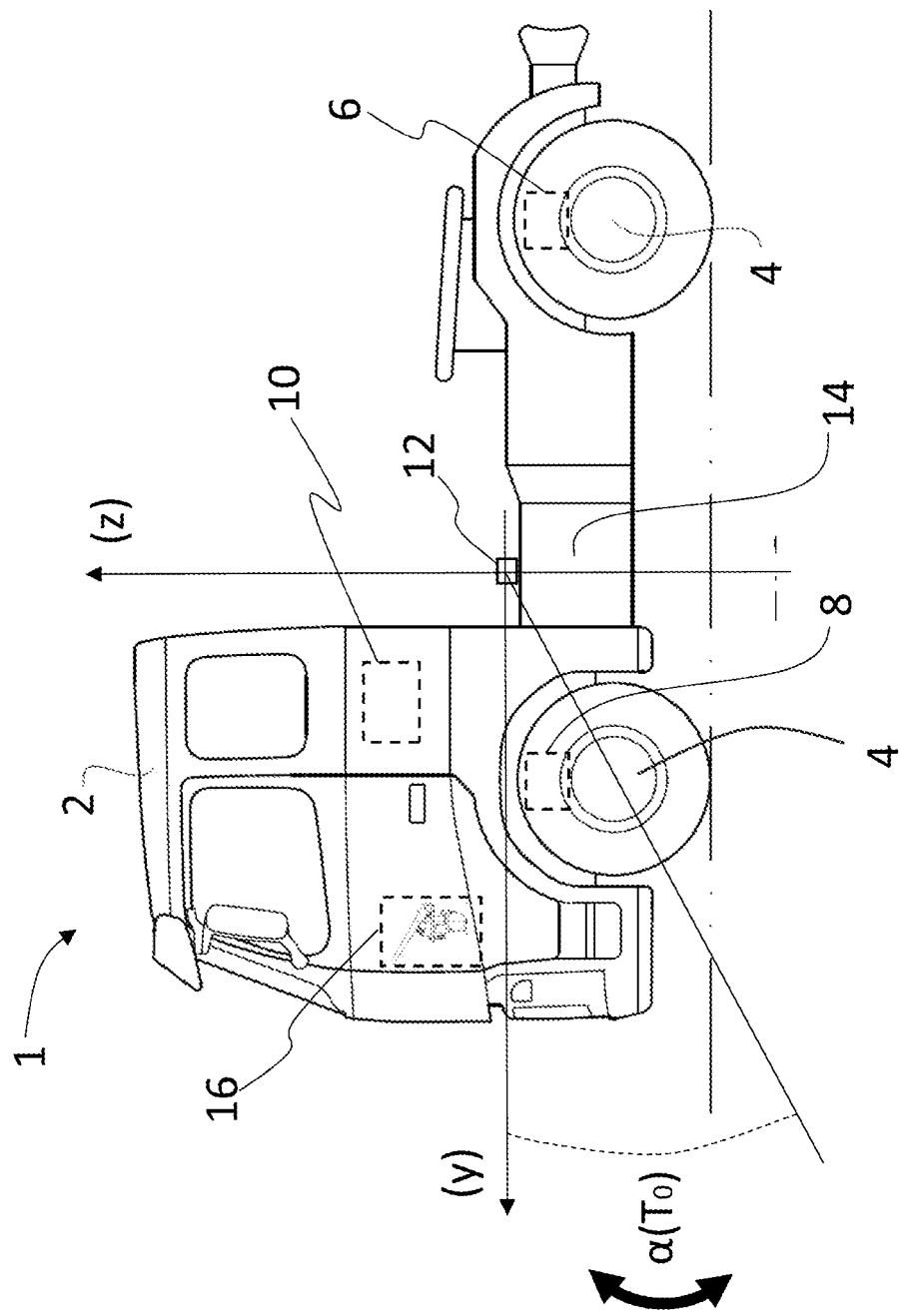
FIG. 1 is an illustration of a vehicle for which the teachings of the present disclosure may be implemented, according to an example.

FIG. 1 is an illustration of a vehicle 1 for which the teachings of the present disclosure may be implemented, according to an example. The exemplary illustration in FIG. 1 shows a tractor unit 1 for towing a trailer unit (not shown), which together make up a semitrailer vehicle. However, the teachings of this disclosure is applicable to other types of vehicles as well. For instance, the vehicle may be a different type of vehicle for cargo transport, such as a truck, or a truck with a dolly unit arranged to tow a trailer unit, etc. The vehicle 1 comprises a cabin 2 in which the driver may operate the vehicle 1, including controlling the acceleration and deceleration of the vehicle. The illustrated vehicle 1 is supported on wheels 4. In particular, a front left wheel and a rear left wheel are shown. The wheels 4 are supported by a front wheel axle and a rear wheel axle, respectively. At the other end of the wheel axles corresponding right wheels are provided. Although the vehicle 1 in FIG. 1 only has four wheels 4, the teachings of this disclosure is also applicable to vehicles having more wheels, such as in the above-mentioned different types of vehicles.

Each wheel 4 may be associated with a respective wheel brake, a service brake. This wheel brake may, e.g. be a pneumatically actuated disc brake or drum brake, which both could be part of regenerative brake systems, which produce electrical power during vehicle retardation, and which may comprise electrical machines able to slow down wheel rotational velocity upon request. The wheel brakes are controlled by a motion support device 6, 8 (MSD), wherein each MSD 6, 8 may suitably control the applied braking force on an individual wheel or a pair of wheels. Each MSD 6, 8 may be communicatively coupled to a processing circuitry 10, allowing the processing circuitry 10 to communicate with the MSDs 6, 8 and thereby control vehicle braking. The location of the processing circuitry 10 and the MSDs 6, 8 do not need to be as illustrated in FIG. 1, but are simply indicated for facilitating the explanation of the disclosure. The processing circuitry 10 may potentially comprise a number of sub-units distributed across the vehicle, or it may be a single physical unit. The processing circuitry 10 may allocate brake force/torque distribution between wheels 4 to counteract discomfort due to brake judder.

FIG. 1 also indicates that a sensor 12 may be provided on the vehicle 1 for measuring oscillation amplitudes. For instance, the sensor 12 may be provided on the chassis 14 to measure angular acceleration amplitude in a vertical geometrical plane. Such a vertical geometrical plane may coincide with, or be parallel with, a plane defined by a vertical axis (2) and a longitudinal axis (y) of the vehicle. The processing circuitry 10 may receive information from the sensor 12 about the oscillation amplitudes with respect to a currently oscillating part, such as a portion of the chassis 14 as illustrated herein.

In FIG. 1 there is also schematically indicated a brake pedal 16 to illustrate that the driver may press the brake pedal 16 to provide a brake request to the processing circuitry 10. As will be discussed in more detail later, the processing circuitry 10 is configured to compare the determined oscillation amplitude (based on the received sensor information) with a predefined reference value, and the processing circuitry 10 is also configured to compare a brake request value (based on information received due to the brake pedal 16 being pressed) with a predefined brake request value. Based on these two comparisons, the processing circuitry 10 may control a brake distribution between front axle brakes and rear axle brakes, such as by sending brake commands to a rear MSD 6 and a front MSD 8. Said controlled brake distribution may either be according to an original brake force/torque distribution setup or according to a redistributed application.

An alternative way to determine the oscillation amplitude will now be discussed in relation to FIG. 2, which schematically illustrates another example of how the teachings of the present disclosure may be implemented.

Figure 2:
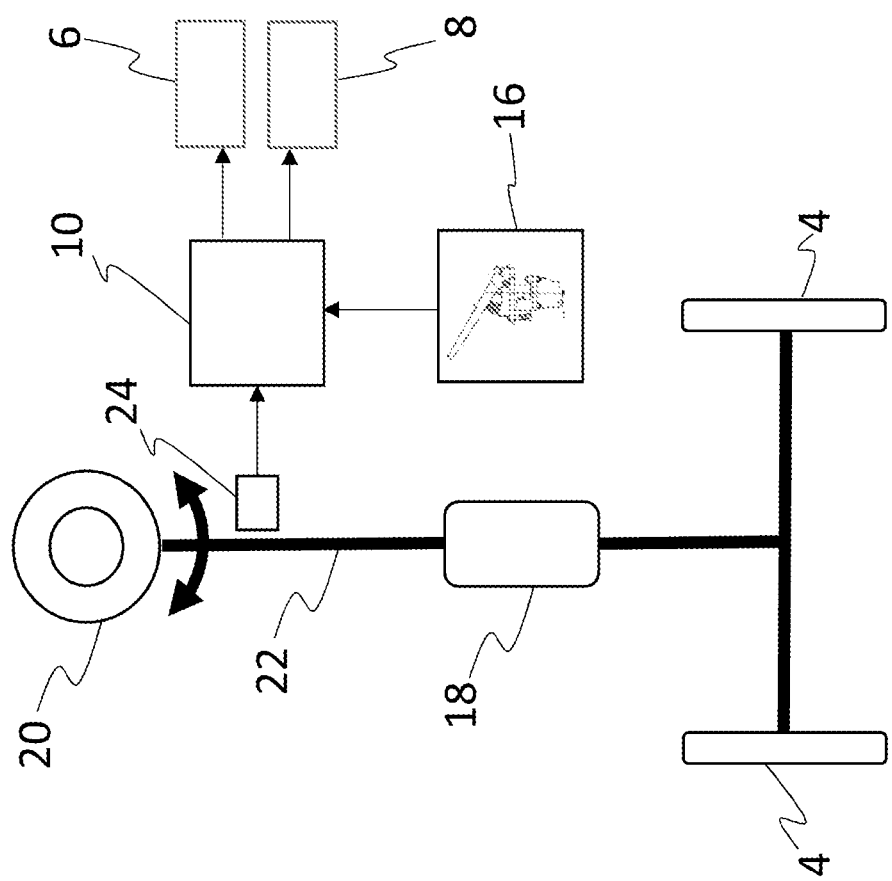
FIG. 2 schematically illustrates another example of how the teachings of the present disclosure may be implemented.

FIG. 2 illustrates a power-assisted steering system including a steering actuator 18 configured to assist in steering the vehicle. The steering system as such may be configured in various ways, and therefore only a very brief general overview of such a steering system is given for explanatory purpose. In addition to compensate for angular deviations of road wheels, the steering actuator 18 may be configured to assist in steering the vehicle in dependence of a desired steering activity by a driver, i.e. when the driver controls a steering wheel 20 or the like (which in turn is connected to a steering column 22). A steering angle sensor 24 may be provided to detect the desired steering activity. This steering angle sensor 24 may also be used for determining the oscillation amplitude. In particular, the processing circuitry 10 may be configured to determine the oscillation amplitude by receiving from the steering angle sensor 24 information about measured angular oscillations of the steering wheel 20 or steering column 22 of the vehicle. The processing circuitry 10 may also receive a brake request value indicative of a desired total brake torque or total brake force (here indicated as a brake request received from a brake pedal 16 or a brake pedal modulator). Similarly to the previous discussion in relation to FIG. 1, based on a comparison of the oscillation amplitude with a predefined reference value and based on a comparison of the brake request value with a predefined brake request value, the processing circuitry 10 may control the brake distribution between the front axle brakes and the rear axle brakes. For instance, the processing circuitry 10 may send commands to the motion support devices 6, 8 that control the rear axle brakes and the front axle brakes, respectively.

Figure 3:
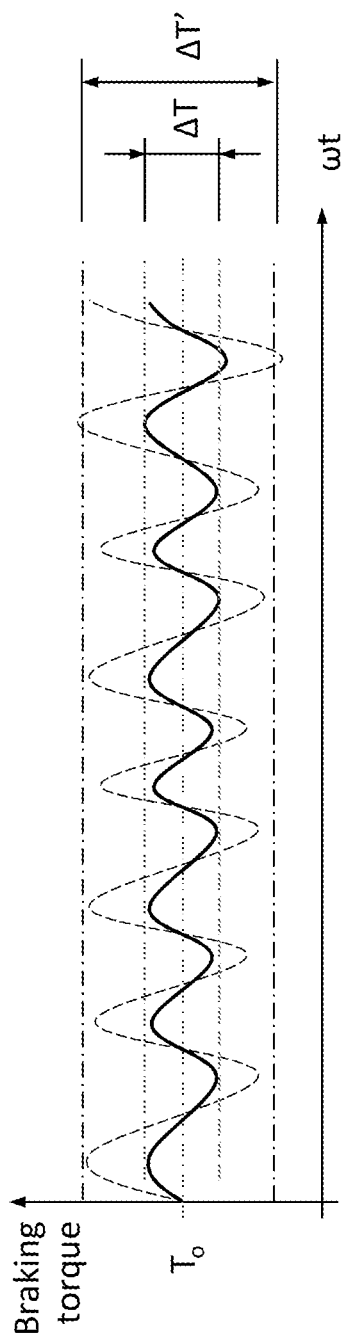
FIG. 3 is a diagram illustrating how braking torque may vary during braking, for example due to irregularities of brake drums or brake disks.

FIG. 3 is a diagram illustrating how braking torque may vary during braking, for example due to irregularities of brake drums or brake disks. Brake judder may normally mainly be caused by the "out of roundness" of the front brake drums or front brake disks. The effect of such "out of roundness" on the judder may increase depending on the braking torque level and the temperature of the brakes. The braking vibration can be represented by the following equation:

$$T = T_o + C \; \mu \; K \; \delta \; R \; \sin(\omega t),$$

where $T_o$ is the nominal torque $C\mu K\delta R \sin(\omega t)$ is the increment of torque ($\Delta T$ and $\Delta T'$ in FIG. 3) that causes the vibration of the front brakes during braking. In more detail:

C is a correction factor,
$\mu$ is the coefficient of friction,
K is the stiffness of the system,
$\delta$ is the run out of the brake drum or brake disk,
R is the brake radius,
$\omega$ is the angular speed of the drum, and
t is time.

In FIG. 3, the amplitude $\Delta T$ of the solid curve represents the maximum increment of torque amplitude that is not considered to cause discomfort and the amplitude $\Delta T'$ of the dashed curve represents any increment of torque, larger than $\Delta T$, that is considered to cause discomfort during braking. The present disclosure teaches to provide a computer system and a computer-implemented method which can change the force distribution among the front and rear axles of the vehicle during braking, without denigrating the braking performance, in order to reduce the perception of vibration by the driver resulting from brake judder.

Figure 4:
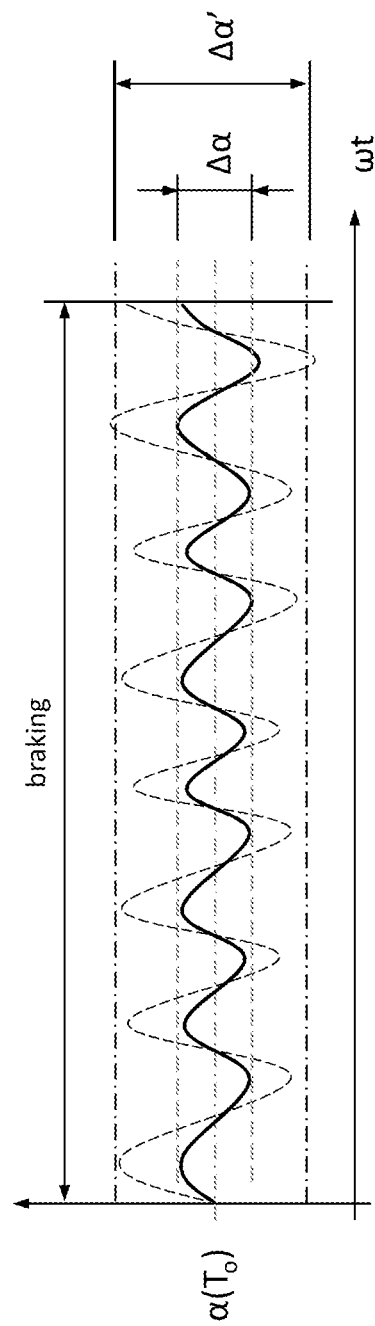
FIG. 4 is a diagram illustrating how angular acceleration level may vary during braking.

FIG. 4 is a diagram illustrating how angular acceleration level may vary during braking. The solid curve illustrates an oscillation having a maximum amplitude $\Delta\alpha$, up to which no judder is assumed to be perceived by the driver. Thus, $\Delta\alpha$ may represent a predefined reference value. If the current oscillation amplitude $\Delta\alpha'$ (dashed curve), which has been determined by the processing circuitry, such as by means of input from previously discussed sensors, is larger than the predefined reference value (i.e. if $\Delta\alpha'>\Delta\alpha$), then the processing circuitry may change the brake force distribution so that the front brakes do not produce vibration (or at least less vibration). If on the other hand $\Delta\alpha'<\Delta\alpha$, then the processing circuitry does not need to change the original brake force distribution strategy. Also during emergency braking the processing circuitry will keep the original brake force distribution regardless of the relationship between Aa' and Aa.

The processing circuitry may be configured to receive and process information, and act upon such received and/or processed information. In particular the processing circuitry may act by controlling the brake distribution, such as keeping an original setup, or redistributing the brake force/torque between axles. In some examples, the processing circuitry may be automatically activated during a brake event so as to perform the discussed comparisons of values and to control the brake distribution. However, in other examples, the activation may be manually triggered. A driver may decide not to make use of the anti-judder comfort-increasing actions that can be offered by the computer system and its processing circuitry, and may therefore decide to maintain the processing circuitry inactivated. The processing circuitry may, in at least some examples, be triggered to receive an activation command which is manually triggered at a user interface, such as at a switch or a control panel, and upon receipt of the activation command the processing circuitry is configured to become activated to perform said comparisons and to control the brake distribution.

Figure 5:
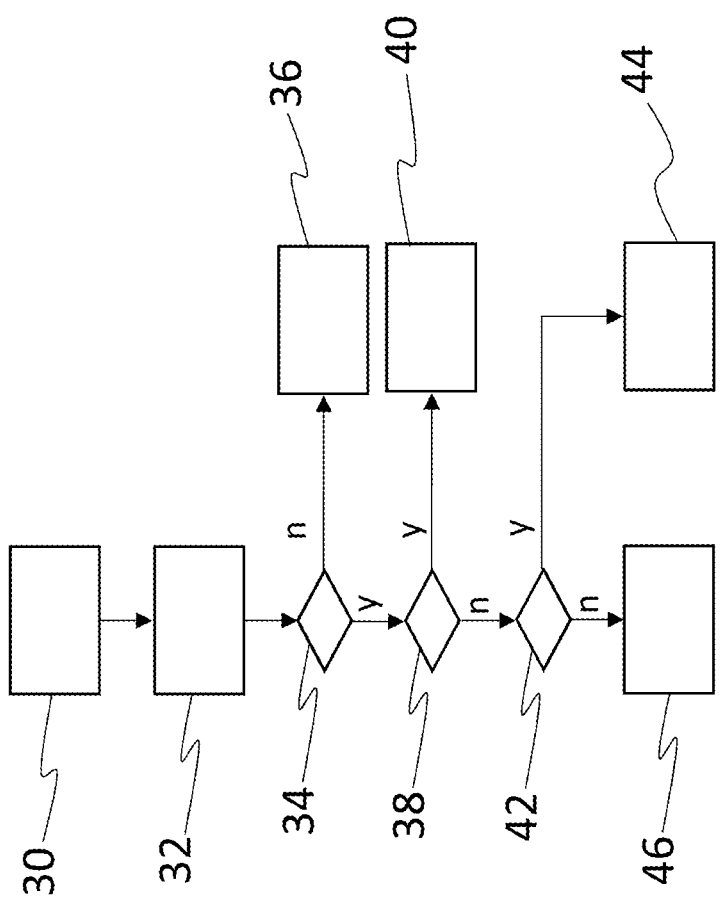
FIG. 5 is a flow chart illustrating the implementation of the teachings of the present disclosure according to at least some examples.

FIG. 5 is a flow chart illustrating the implementation of the teachings of the present disclosure according to at least some examples. Here it is assumed that the processing circuitry is in an activated state, be it automatically or manually. When a braking event, 30, is started, the processing circuitry may determine, 32, an oscillation amplitude $\Delta\alpha'$ of a currently oscillating part of a vehicle, such as the chassis as discussed in FIG. 1 or the steering wheel/column as discussed in relation to FIG. 2. The processing circuitry may determine, 34, if the oscillation amplitude $\Delta\alpha'$ is higher than a predefined reference value $\Delta\alpha$, i.e. to determine if $\Delta\alpha'>\Delta\alpha$. If the answer is no, then the processing circuitry will keep, 36, the original set up as regards the distributional participation of the front and rear axle brakes. If the answer is yes, then the processing circuitry determines, 38, if the received brake request is greater than a first predefined brake request value.

The first predefined brake request value is set at a level that captures an emergency braking scenario. So, if the answer to the brake request comparison is yes, i.e. the brake request being indicative of an emergency braking, then the processing circuitry will keep, 40, the original brake distribution setup, and allow the front axle brakes and rear axle brakes to continue without redistributing their participation during the braking event. If on the other hand the answer to the brake request comparison is no, i.e. the brake request value received by the processing circuitry is not higher than the first predefined brake request value, then the processing circuitry will make the comparison, 42, with a second brake predefined brake request value.

The second predefined brake request value may be set so as to distinguish between a relatively high and a relatively low brake request. At a relatively high brake request, a larger participation of the front axle brakes may be desirable to avoid a too uneven wear of the front and rear axle brakes. The second predefined brake request value is a lower value than the first predefined brake request value. Thus, the processing circuitry may determine, 42, if the received brake request is lower than the second predefined brake request value. If the answer is yes, then the processing circuitry may control, 44, the brake distribution so that the contribution of the rear axle brakes on the braking increases as the contribution of the front axle brakes decreases considerably. For instance, the participation of the rear axle brakes may be redistributed to 75% and the participation of the front axle brakes to 25%, just to give an example. If the answer is not, i.e. the received brake request value is between the first and second predefined brake request values, then the processing circuitry may control, 46, the brake distribution so that the contribution of the rear axle brakes on the braking increases as the contribution of the front axle brakes decreases moderately. For instance, the participation of the rear axle brakes may be redistributed to 60% and the participation of the front axle brakes to 40%, just to give an example. By means of this redistribution strategy a total requested brake force will still be applied, but redistributed so as to reduce or eliminate any discomfort due resulting from brake judder. The predefined brake request values as well as the predefined reference value $\Delta$ a may be stored in an electronic memory included in or accessible by the processing circuitry.

Figure 6:
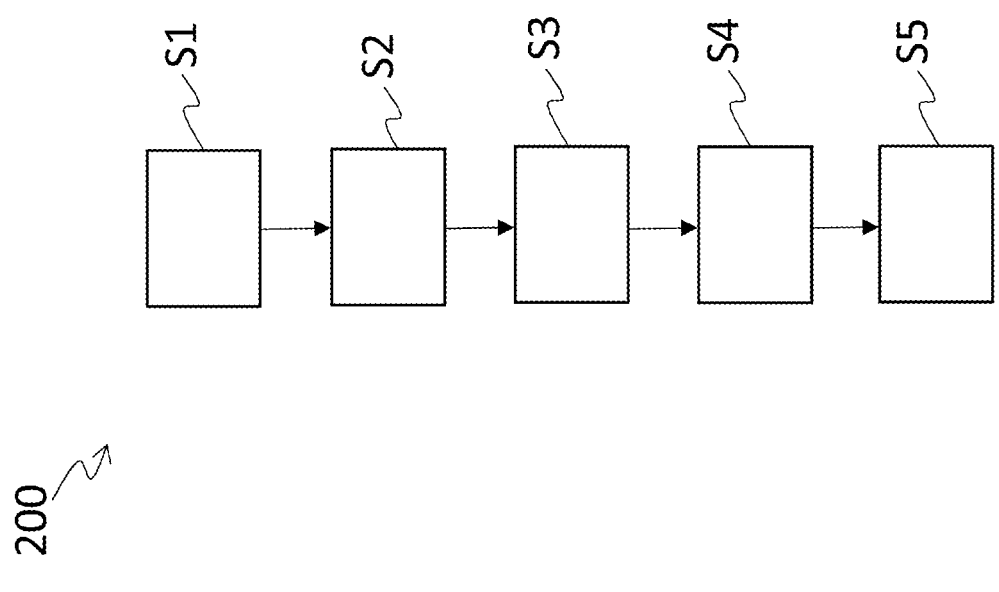
FIG. 6 schematically illustrates a computer-implemented method according to at least one example of the present disclosure.

FIG. 6 schematically illustrates a computer-implemented method according to at least one example of the present disclosure. In particular, FIG. 6 illustrates a computer-implemented method of increasing driver comfort during a braking event of a vehicle having front axle brakes and rear axle brakes. The method comprises:

in an action S1, determining, by a processing circuitry of a computer system, during a braking event of a vehicle, an oscillation amplitude of a currently oscillating part of the vehicle, in an action S2, performing, by the processing circuitry, an amplitude comparison by comparing the determined oscillation amplitude with a predefined reference value, in an action S3, receiving, by the processing circuitry, a brake request value indicative of a desired total brake torque or total brake force, in an action S4, performing, by the processing circuitry, a brake request comparison by comparing the received brake request value with a predefined brake request value, and in an action S5, controlling, by the processing circuitry, a brake distribution between front axle brakes and rear axle brakes of the vehicle based on the amplitude comparison and the brake request comparison, wherein said brake distribution is in the form of a brake torque distribution of said desired total brake torque or a brake force distribution of said desired total brake force.

It should be noted that the above actions S1-S5 do not need to be performed in the presented order. For instance, the determining (S1) can be made simultaneously with or even after the receiving (S3). Similarly, the comparisons in S2 and S3 may be performed simultaneously with or subsequently after one another in either order.

Figure 7:
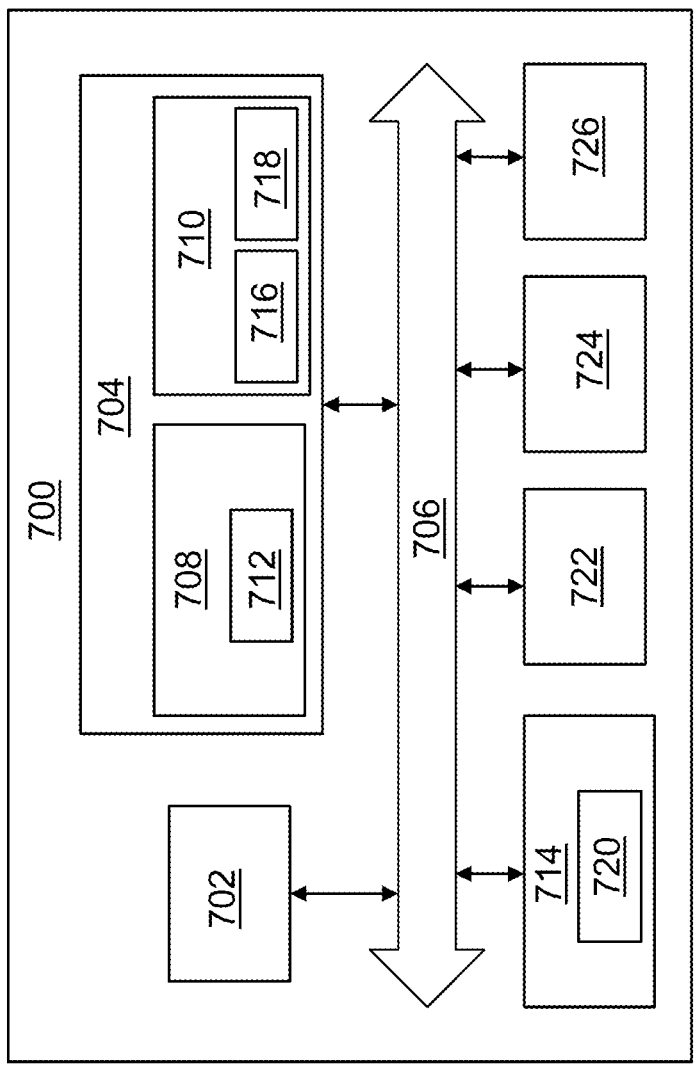
FIG. 7 is a schematic diagram of an exemplary computer system for implementing examples disclosed herein, according to an example.

FIG. 7 is a schematic diagram of a computer system 700 for implementing examples disclosed herein. The computer system 700 is adapted to execute instructions from a computer-readable medium to perform these and/or any of the functions or processing described herein. The computer system 700 may be connected (e.g., networked) to other machines in a LAN, an intranet, an extranet, or the Internet. While only a single device is illustrated, the computer system 700 may include any collection of devices that individually or jointly execute a set (or multiple sets) of instructions to perform any one or more of the methodologies discussed herein. Accordingly, any reference in the disclosure and/or claims to a computer system, computing system, computer device, computing device, control system, control unit, electronic control unit (ECU), processor device, processing circuitry, etc., includes reference to one or more such devices to individually or jointly execute a set (or multiple sets) of instructions to perform any one or more of the methodologies discussed herein. For example, control system may include a single control unit or a plurality of control units connected or otherwise communicatively coupled to each other, such that any performed function may be distributed between the control units as desired. Further, such devices may communicate with each other or other devices by various system architectures, such as directly or via a Controller Area Network (CAN) bus, etc.

The computer system 700 may comprise at least one computing device or electronic device capable of including firmware, hardware, and/or executing software instructions to implement the functionality described herein. The computer system 700 may include processing circuitry 702 (e.g., processing circuitry including one or more processor devices or control units), a memory 704, and a system bus 706. The processing circuitry 710 may correspond to the processing circuitry 10 in FIGS. 1 and 2. The computer system 700 may include at least one computing device having the processing circuitry 702. The system bus 706 provides an interface for system components including, but not limited to, the memory 704 and the processing circuitry 702. The processing circuitry 702 may include any number of hardware components for conducting data or signal processing or for executing computer code stored in memory 704. The processing circuitry 702 may, for example, include a general-purpose processor, an application specific processor, a Digital Signal Processor (DSP), an Application Specific Integrated Circuit (ASIC), a Field Programmable Gate Array (FPGA), a circuit containing processing components, a group of distributed processing components, a group of distributed computers configured for processing, or other programmable logic device, discrete gate or transistor logic, discrete hardware components, or any combination thereof designed to perform the functions described herein. The processing circuitry 702 may further include computer executable code that controls operation of the programmable device.

The system bus 706 may be any of several types of bus structures that may further interconnect to a memory bus (with or without a memory controller), a peripheral bus, and/or a local bus using any of a variety of bus architectures. The memory 704 may be one or more devices for storing data and/or computer code for completing or facilitating methods described herein. The memory 704 may include database components, object code components, script components, or other types of information structure for supporting the various activities herein. Any distributed or local memory device may be utilized with the systems and methods of this description. The memory 704 may be communicably connected to the processing circuitry 702 (e.g., via a circuit or any other wired, wireless, or network connection) and may include computer code for executing one or more processes described herein. The memory 704 may include non-volatile memory 708 (e.g., read-only memory (ROM), erasable programmable read-only memory (EPROM), electrically erasable programmable read-only memory (EEPROM), etc.), and volatile memory 710 (e.g., random-access memory (RAM)), or any other medium which can be used to carry or store desired program code in the form of machine-executable instructions or data structures and which can be accessed by a computer or other machine with processing circuitry 702. A basic input/output system (BIOS) 712 may be stored in the non-volatile memory 708 and can include the basic routines that help to transfer information between elements within the computer system 700.

The computer system 700 may further include or be coupled to a non-transitory computer-readable storage medium such as the storage device 714, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 714 and other drives associated with computer-readable media and computer-usable media may provide non-volatile storage of data, data structures, computer-executable instructions, and the like.

Computer-code which is hard or soft coded may be provided in the form of one or more modules. The module(s) can be implemented as software and/or hard-coded in circuitry to implement the functionality described herein in whole or in part. The modules may be stored in the storage device 714 and/or in the volatile memory 710, which may include an operating system 716 and/or one or more program modules 718. All or a portion of the examples disclosed herein may be implemented as a computer program 720 stored on a transitory or non-transitory computer-usable or computer-readable storage medium (e.g., single medium or multiple media), such as the storage device 714, which includes complex programming instructions (e.g., complex computer-readable program code) to cause the processing circuitry 702 to carry out actions described herein. Thus, the computer-readable program code of the computer program 720 can comprise software instructions for implementing the functionality of the examples described herein when executed by the processing circuitry 702. In some examples, the storage device 714 may be a computer program product (e.g., readable storage medium) storing the computer program 720 thereon, where at least a portion of a computer program 720 may be loadable (e.g., into a processor) for implementing the functionality of the examples described herein when executed by the processing circuitry 702. The processing circuitry 702 may serve as a controller or control system for the computer system 700 that is to implement the functionality described herein.

The computer system 700 may include an input device interface 722 configured to receive input and selections to be communicated to the computer system 700 when executing instructions, such as from a keyboard, mouse, touch-sensitive surface, etc. Such input devices may be connected to the processing circuitry 702 through the input device interface 722 coupled to the system bus 706 but can be connected through other interfaces, such as a parallel port, an Institute of Electrical and Electronic Engineers (IEEE) 1394 serial port, a Universal Serial Bus (USB) port, an IR interface, and the like. The computer system 700 may include an output device interface 724 configured to forward output, such as to a display, a video display unit (e.g., a liquid crystal display (LCD) or a cathode ray tube (CRT)). The computer system 700 may include a communications interface 726 suitable for communicating with a network as appropriate or desired.

The operational actions described in any of the exemplary aspects herein are described to provide examples and discussion. The actions may be performed by hardware components, may be embodied in machine-executable instructions to cause a processor to perform the actions, or may be performed by a combination of hardware and software. Although a specific order of method actions may be shown or described, the order of the actions may differ. In addition, two or more actions may be performed concurrently or with partial concurrence.

Example 1: A computer system comprising processing circuitry configured to:
 determine, during a braking event of a vehicle, an oscillation amplitude of a currently oscillating part of the vehicle,
 perform an amplitude comparison by comparing the determined oscillation amplitude with a predefined reference value,
 receive a brake request value indicative of a desired total brake torque or total brake force,
 perform a brake request comparison by comparing the received brake request value with a predefined brake request value, and
 control a brake distribution between front axle brakes and rear axle brakes of the vehicle based on the amplitude comparison and the brake request comparison, wherein said brake distribution is in the form of a brake torque distribution of said desired total brake torque or a brake force distribution of said desired total brake force.

Example 2: The computer system of example 1, wherein the processing circuitry is configured to, upon the brake request comparison revealing that the received brake request value is higher than the predefined brake request value, controlling the application of the front axle brakes and the rear axle brakes to apply and maintain an originally set brake torque or brake force distribution.

Example 3: The computer system of any of examples 1-2, wherein the processing circuitry is configured to, upon the amplitude comparison and the brake request comparison revealing that the determined oscillation amplitude is larger than the predefined reference value and that the received brake request value is lower than the predefined brake request value:
 control said brake distribution between the front axle brakes and the rear axle brakes such that the contribution of the rear axle brakes on the braking increases and the contribution of the front axle brakes decreases relative to the originally set brake torque or brake force distribution.

Example 4: The computer system of any of examples 1-3, wherein the processing circuitry is configured to control said brake distribution based on the magnitude of the received brake request value.

Example 5: The computer system of any of examples 1-4, wherein said predefined brake request value is a first predefined brake request value, wherein said brake request comparison further comprises comparing the received brake request value with a second predefined brake request value, wherein the processing circuitry is configured to apply a first brake distribution if the received brake request value is between said first and second predefined brake request values, and apply a second brake distribution if the received brake request value is lower than said second predefined brake request value.

Example 6: The computer system of example 5, wherein the first predefined brake request value is higher than the second predefined brake request value, wherein when applying the first brake distribution, the processing circuitry is configured to allocated a lower brake torque to the rear axle brakes compared to when applying the second brake distribution.

Example 7: The computer system of any of examples 1-6, wherein the processing circuitry is configured to determine the oscillation amplitude by receiving from a sensor information about a measured angular acceleration amplitude in a vertical geometrical plane for the currently oscillating part.

Example 8: The computer system of any of examples 1-6, wherein the processing circuitry is configured to determine the oscillation amplitude by receiving from a steering angle sensor information about measured angular oscillations of a steering wheel or steering column of the vehicle.

Example 9: The computer system of any of examples 1-6, wherein the processing circuitry is configured to be automatically activated during a brake event to perform said comparisons and said control of the brake distribution, or wherein the processing circuitry is configured to receive an activation command which is manually triggered at a user interface, such as at a switch or a control panel, and upon receipt of the activation command the processing circuitry is configured to become activated to perform said comparisons and said control of the brake distribution.

Example 10: The computer system of any of examples 8-9, further comprising said sensor, wherein the sensor is configured to measure oscillation amplitudes and inform the processing circuitry of the results of the measurements.

Example 11: A vehicle comprising the computer system of any of examples 1-10.

Example 12: A computer-implemented method of increasing driver comfort during a braking event of a vehicle having front axle brakes and rear axle brakes, the method comprising:
 determining, by a processing circuitry of a computer system, during a braking event of a vehicle, an oscillation amplitude of a currently oscillating part of the vehicle, performing, by the processing circuitry, an amplitude comparison by comparing the determined oscillation amplitude with a predefined reference value, receiving, by the processing circuitry, a brake request value indicative of a desired total brake torque or total brake force, performing, by the processing circuitry, a brake request comparison by comparing the received brake request value with a predefined brake request value, and controlling, by the processing circuitry, a brake distribution between front axle brakes and rear axle brakes of the vehicle based on the amplitude comparison and the brake request comparison, wherein said brake distribution is in the form of a brake torque distribution of said desired total brake torque or a brake force distribution of said desired total brake force.

Example 13: The method of example 12, further comprising:

controlling, by the processing circuitry, the application of the front axle brakes and rear axle brakes to apply and maintain an originally set brake torque or brake force distribution when the brake request comparison reveals that the received brake request value is higher than the predefined brake request value.

Example 14: The method of any of examples 12-13, further comprising:

controlling, by the processing circuitry, said brake distribution between the front axle brakes and the rear axle brakes such that the contribution of the rear axle brakes on the braking increases as the contribution of the front axle brakes decreases relative to the originally set brake torque or brake force distribution when the amplitude comparison and the brake request comparison reveal that the determined oscillation amplitude is larger than the predefined reference value and that the received brake request value is lower than the predefined brake request value.

Example 15: The method of any of examples 12-14, wherein said predefined brake request value is a first predefined brake request value, wherein said brake request comparison further comprises comparing the received brake request value with a second predefined brake request value, the method further comprising:

applying, by the processing circuitry, a first brake distribution when the received brake request value is between said first and second predefined brake request values, and applying a second brake distribution when the received brake request value is lower than said second predefined brake request value.

Example 16: The method of example 15, wherein the first predefined brake request value is higher than the second predefined brake request value, the method further comprising:

allocating, by the processing circuitry, a lower brake torque to the rear axle brakes when applying the first brake distribution compared to when applying the second brake distribution.

Example 17: The method of any of examples 12-16, further comprising:

determining, by the processing circuitry, the oscillation amplitude by receiving from a sensor information about a measured angular acceleration amplitude in a vertical geometrical plane for the currently oscillating part.

Example 18: The method of any of examples 12-16, further comprising:

determining, by the processing circuitry, the oscillation amplitude by receiving from a steering angle sensor information about measured angular oscillations of a steering wheel or steering column of the vehicle.

Example 19: A computer program product comprising program code for performing, when executed by the processing circuitry, the method of any of examples 12-18.

Example 20: A non-transitory computer-readable storage medium comprising instructions, which when executed by the processing circuitry, cause the processing circuitry to perform the method of any of examples 12-18.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, actions, steps, operations, elements, and/or components, but do not preclude the presence or addition of one or more other features, integers, actions, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the disclosure being set forth in the following claims.

What is claimed is:

1. A computer system comprising processing circuitry configured to:

determine, during a braking event of a vehicle, an oscillation amplitude of a currently oscillating part of the vehicle, perform an amplitude comparison by comparing the determined oscillation amplitude with a predefined reference value, receive a brake request value indicative of a desired total brake torque or total brake force, perform a brake request comparison by comparing the received brake request value with a predefined brake request value, and control a brake distribution between front axle brakes and rear axle brakes of the vehicle based on the amplitude comparison and the brake request comparison, wherein said brake distribution is in the form of a brake torque distribution of said desired total brake torque or a brake force distribution of said desired total brake force;

wherein the processing circuitry is configured to, upon the amplitude comparison and the brake request comparison revealing that the determined oscillation amplitude is larger than the predefined reference value and that the received brake request value is lower than the predefined brake request value:

control said brake distribution between the front axle brakes and the rear axle brakes such that the contribution of the rear axle brakes on the braking increases as the contribution of the front axle brakes decreases relative to the originally set brake torque or brake force distribution.

2. The computer system of claim 1, wherein the processing circuitry is configured to, upon the brake request comparison revealing that the received brake request value is higher than the predefined brake request value, controlling the application of the front axle brakes and the rear axle brakes to apply and maintain an originally set brake torque or brake force distribution.

3. The computer system of claim 1, wherein the processing circuitry is configured to control said brake distribution based on the magnitude of the received brake request value.

4. The computer system of claim 1, wherein said predefined brake request value is a first predefined brake request value, wherein said brake request comparison further comprises comparing the received brake request value with a second predefined brake request value, wherein the processing circuitry is configured to apply a first brake distribution if the received brake request value is between said first and second predefined brake request values, and apply a second brake distribution if the received brake request value is lower than said second predefined brake request value.

5. The computer system of claim 4, wherein the first predefined brake request value is higher than the second predefined brake request value, wherein when applying the first brake distribution, the processing circuitry is configured to allocated a lower brake torque to the rear axle brakes compared to when applying the second brake distribution.

6. The computer system of claim 1, wherein the processing circuitry is configured to determine the oscillation amplitude by receiving from a sensor information about a measured angular acceleration amplitude in a vertical geometrical plane for the currently oscillating part.

7. The computer system of claim 1, wherein the processing circuitry is configured to determine the oscillation amplitude by receiving from a steering angle sensor information about measured angular oscillations of a steering wheel or steering column of the vehicle.

8. The computer system of claim 7, further comprising said sensor, wherein the sensor is configured to measure oscillation amplitudes and inform the processing circuitry of the results of the measurements.

9. The computer system of claim 1, wherein the processing circuitry is configured to be automatically activated during a brake event to perform said comparisons and said control of the brake distribution, or wherein the processing circuitry is configured to receive an activation command which is manually triggered at a user interface, such as at a switch or a control panel, and upon receipt of the activation command the processing circuitry is configured to become activated to perform said comparisons and said control of the brake distribution.

10. A vehicle comprising the computer system of claim 1.

11. The computer system of claim 1, wherein the predefined brake request value is indicative of an emergency braking situation.

12. A computer-implemented method of increasing driver comfort during a braking event of a vehicle having front axle brakes and rear axle brakes, the method comprising:

determining, by a processing circuitry of a computer system, during a braking event of a vehicle, an oscillation amplitude of a currently oscillating part of the vehicle, performing, by the processing circuitry, an amplitude comparison by comparing the determined oscillation amplitude with a predefined reference value, receiving, by the processing circuitry, a brake request value indicative of a desired total brake torque or total brake force, performing, by the processing circuitry, a brake request comparison by comparing the received brake request value with a predefined brake request value, controlling, by the processing circuitry, a brake distribution between front axle brakes and rear axle brakes of the vehicle based on the amplitude comparison and the brake request comparison, wherein said brake distribution is in the form of a brake torque distribution of said desired total brake torque or a brake force distribution of said desired total brake force; and controlling, by the processing circuitry, said brake distribution between the front axle brakes and the rear axle brakes such that the contribution of the rear axle brakes on the braking increases as the contribution of the front axle brakes decreases relative to the originally set brake torque or brake force distribution when the amplitude comparison and the brake request comparison reveal that the determined oscillation amplitude is larger than the predefined reference value and that the received brake request value is lower than the predefined brake request value.

13. The method of claim 12, further comprising:

controlling, by the processing circuitry, the application of the front axle brakes and rear axle brakes to apply and maintain an originally set brake torque or brake force distribution when the brake request comparison reveals that the received brake request value is higher than the predefined brake request value.

14. The method of claim 12, wherein said predefined brake request value is a first predefined brake request value, wherein said brake request comparison further comprises comparing the received brake request value with a second predefined brake request value, the method further comprising:

applying, by the processing circuitry, a first brake distribution when the received brake request value is between said first and second predefined brake request values, and applying a second brake distribution when the received brake request value is lower than said second predefined brake request value.

15. The method of claim 14, wherein the first predefined brake request value is higher than the second predefined brake request value, the method further comprising:
allocating, by the processing circuitry, a lower brake torque to the rear axle brakes when applying the first brake distribution compared to when applying the second brake distribution.

16. The method of claim 12, further comprising:
determining, by the processing circuitry, the oscillation amplitude by receiving from a sensor information about a measured angular acceleration amplitude in a vertical geometrical plane for the currently oscillating part.

17. The method of claim 12, further comprising:
determining, by the processing circuitry, the oscillation amplitude by receiving from a steering angle sensor information about measured angular oscillations of a steering wheel or steering column of the vehicle.

18. A non-transitory computer-readable storage medium comprising instructions, which when executed by the processing circuitry, cause the processing circuitry to perform the method of claim 12.

19. The method of claim 12, wherein the predefined brake request value is indicative of an emergency braking situation.

20. A computer system comprising processing circuitry configured to:
determine, during a braking event of a vehicle, an oscillation amplitude of a currently oscillating part of the vehicle,
perform an amplitude comparison by comparing the determined oscillation amplitude with a predefined reference value,
receive a brake request value indicative of a desired total brake torque or total brake force,
perform a brake request comparison by comparing the received brake request value with a predefined brake request value, and
control a brake distribution between front axle brakes and rear axle brakes of the vehicle based on the amplitude comparison and the brake request comparison, wherein said brake distribution is in the form of a brake torque distribution of said desired total brake torque or a brake force distribution of said desired total brake force;
wherein said predefined brake request value is a first predefined brake request value, wherein said brake request comparison further comprises comparing the received brake request value with a second predefined brake request value, wherein the processing circuitry is configured to apply a first brake distribution if the received brake request value is between said first and second predefined brake request values, and apply a second brake distribution if the received brake request value is lower than said second predefined brake request value.

* * * * *